US012674972B2

(12) United States Patent
Patscheider et al.

(10) Patent No.: US 12,674,972 B2
(45) Date of Patent: Jul. 7, 2026

(54) TUNABLE OPTICAL COMPONENT AND METHOD FOR FABRICATION OF TUNABLE OPTICAL COMPONENT

(71) Applicant: Optotune Switzerland AG, Dietikon (CH)

(72) Inventors: Roman Patscheider, Winterthur (CH); Christopher Laning, Windisch (CH); David Andreas Niederer, Küttigen (CH); Manuel Aschwanden, Allenwinden (CH)

(73) Assignee: Optotune Switzerland AG, Dietikon (CH)

( * ) Notice: Subject to any disclaimer, the term of this patent is extended or adjusted under 35 U.S.C. 154(b) by 333 days.

(21) Appl. No.: 18/258,561

(22) PCT Filed: Dec. 21, 2021

(86) PCT No.: PCT/EP2021/087006
§ 371 (c)(1),
(2) Date: Jun. 21, 2023

(87) PCT Pub. No.: WO2022/136381
PCT Pub. Date: Jun. 30, 2022

(65) Prior Publication Data
US 2023/0375819 A1       Nov. 23, 2023

(30) Foreign Application Priority Data
Dec. 21, 2020     (EP) ..................................... 20216223

(51) Int. Cl.
*G02B 26/00*       (2006.01)
*G02B 26/08*       (2006.01)

(52) U.S. Cl.
CPC ....... *G02B 26/004* (2013.01); *G02B 26/0825* (2013.01); *G02B 26/0858* (2013.01)

(58) Field of Classification Search
CPC .. G02B 3/14; G02B 27/0172; G02B 27/0176; G02B 2027/0138; G02B 2027/0178; G02C 7/085; G06F 3/016
See application file for complete search history.

(56) References Cited

FOREIGN PATENT DOCUMENTS

| | | |
|---|---|---|
| CN | 101379418 A | 3/2009 |
| CN | 106164715 A | 11/2016 |
| EP | 2860556 A1 | 4/2015 |

(Continued)

*Primary Examiner* — James C. Jones
(74) *Attorney, Agent, or Firm* — JMB Davis Ben-David

(57) ABSTRACT

The invention relates to a tunable optical component (100) comprising a liquid chamber (101), a flexible membrane (1), a shaping element (3), and an actuator (2), wherein the liquid chamber (101) is filled with a liquid (102), the membrane (1) delimits the liquid chamber (101), the membrane (1) is attached to the shaping element (3), the shaping element (3) has a ring shape, wherein the shaping element (3) surrounds an optically active area (10) of the membrane (1), the actuator (2) comprises multiple piezo units (20), the piezo unit (20) is coupled to a counterpart (203) in a releasable force-fitting manner, the piezo unit (20) is arranged to move the counterpart (203), and wherein the relative movement of the counterpart (203) and the piezo unit (20) results in a movement of the liquid (102), which causes a change of an optical property of the optically active area (10).

22 Claims, 6 Drawing Sheets

(56) References Cited

FOREIGN PATENT DOCUMENTS

| WO | 2013126986 | 9/2013 | |
| WO | 2020120806 | 6/2020 | |
| WO | WO-2020120806 A1 * | 6/2020 | ........... G02B 26/004 |

* cited by examiner

TUNABLE OPTICAL COMPONENT AND METHOD FOR FABRICATION OF TUNABLE OPTICAL COMPONENT

CROSS-REFERENCE TO RELATED APPLICATIONS

This is the U.S. National Stage of International Patent Application No. PCT/EP2021/087006 filed on Dec. 21, 2021, which claims priority to European Patent Application No. 20216223.6 filed on Dec. 21, 2020.

The present disclosure concerns a tunable optical component and a method for fabrication of a tunable optical component. The tunable optical component may be a tunable lens or a tunable prism.

As shown in the exemplary embodiment of FIG. 8, the tunable optical component 100 comprises a liquid chamber 101 which is delimited by a flexible membrane 1. The optical component 100 comprises a shaping element 3 which surrounds an optically active area 10 of the membrane 1, and an actuator 2, wherein the actuator 2 comprises multiple piezo units 20. The liquid chamber 101 is filled with a liquid 102. For tuning optical properties of the optical component 100 the optically active area 10 of the membrane is deformed in a definable manner.

The membrane delimits the liquid chamber 101 on one side. By moving the liquid 102 in the liquid chamber, the optically active area is deformed. The membrane is attached to the shaping element. In particular, the shaping element 3 may be moved by means of the actuator 2, to alter the shape of the optically active area 10 in a definable manner.

The actuator 2 comprises multiple piezo units 20, wherein each piezo unit 20 comprises a piezo element 201. The piezo element 201 has piezo electric properties, which are utilized to alter the optical properties of the tunable optical component. In particular, the piezo unit 20 is arranged to move the shaping element 3. The piezo unit 20 is coupled to a counterpart 203 in a releasable force-fitting manner. Here and in the following, force-fitting connections require a normal force on the surfaces to be connected. In a first state of the actuator the mutual displacement of the piezo unit 20 and the counterpart 203 is prevented as long as the counter-force caused by the static friction is not exceeded. In a second state of the actuator 2, the force or frictional connection is released and a contact area between the piezo unit and the counterpart 203 is moved along a surface of the counterpart 203. In particular, the piezo unit and the counterpart slide on each other if the tangentially acting load force is greater than the static friction force. The actuator is arranged to switch between the first state and the second state, to move the counterpart with respect to the piezo unit. The relative movement of the counterpart 203 and the piezo unit 20 results in a movement of the liquid 102, which causes a change of an optical property of the optically active area 10.

Tunable optical component 100 is a tunable lens, and the optical property is at least one of sphere power, cylinder power, cylinder axis, prism power, prism axis.

Here and in the following, meridians of the tunable lens describe imaginary straight lines extending along the main plain of extension of the membrane through the optical axis of the tunable lens, wherein different meridians extend at an angle with respect to each other.

Sphere (abbreviated as SPH) indicates the amount of lens power, measured in diopters of focal length. The deflection of the membrane for sphere is equal in all meridians of the tunable lens. The tunable lens is arranged to alter the lens power by a definable deformation of the membrane.

Cylinder (abbreviated as CYL) power indicates the lens power for astigmatism of the tunable lens. The membrane has a non-spherical surface shape for generating cylinder power. In particular, for generating cylinder power the membrane has a shape so that along a first meridian the membrane has no added curvature, and along a second meridian the membrane has the maximum added curvature, wherein the first meridian and the second meridian extend perpendicular with respect to each other. The tunable lens is arranged to alter the curvature of the membrane along the second meridian.

Cylinder axis describes the angle of the first meridian, which has no added curvature to correct astigmatism. In other words, the cylinder axis is the angle of the first lens meridian that is 90 degrees away from the second meridian, wherein the second meridian contains the cylinder power. The cylinder axis is defined with an angle from 1° to 180°. The tunable lens may be arranged to alter the cylinder axis from 1° to 180° angle.

In particular, optical properties are prism power and prism axis and add. Prism power is the amount of prismatic power of the tunable lens, measured in prism diopters ("p.d." or a superscript triangle). Prism power is indicated in either metric or fractional English units (0.5 or ½, for example). Prism corresponds to a tilt of the membrane's surface with respect to the optical axis. Prism power defines absolute of the angle by which the membrane's surface is tilted. The tunable lens may be arranged to alter the prism power.

Prism axis is the direction of prismatic power of the tunable lens. The prism axis indicates the angle of the meridian around which the surface of the tunable lens is tilted with respect to the optical axis. The prism axis may extend along any meridian. The prism axis may be defined by an angle from 1° to 360°. The tunable lens may be arranged to alter the prism axis from 1° to 360°.

Add is the added magnifying power applied to a portion of the tunable lens. In particular, a tunable lens with Add is a multifocal lens. The added magnifying power may range from +0.75 to +3.00 diopters.

Figure 1:
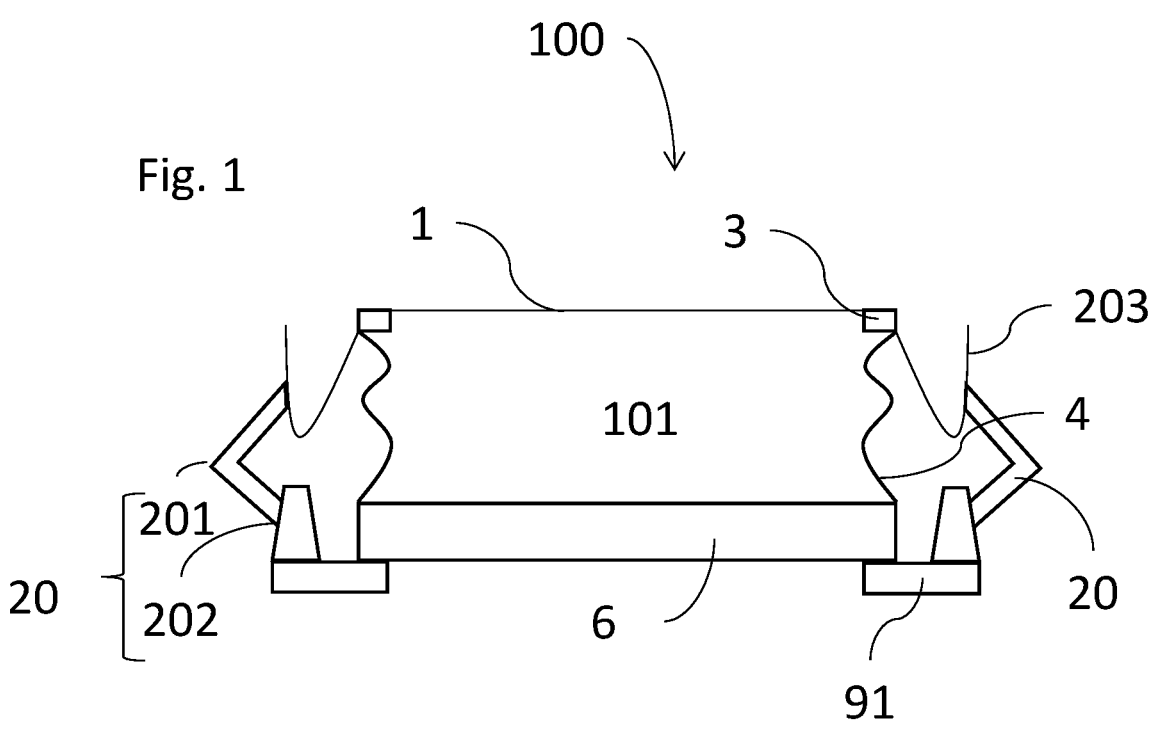
FIG. 1 shows an embodiment of the tunable lens in which the counterpart is an elastic element.

As shown in the embodiment of the tunable lens 100 of FIG. 1, the counterpart 203 is an elastic element, wherein the resonance frequency of the elastic element 203 is smaller than a resonance frequency of the piezo unit 20. The piezo unit comprises a piezo element 201 and a lever 202. The lever 201 is in direct mechanical connection to the counterpart 203, whereby the lever 201 and the counterpart 203 form a contact surface. The counterpart 203, in particular the elastic element, is formed in a one-piece manner with the shaping element 3.

Figure 2:
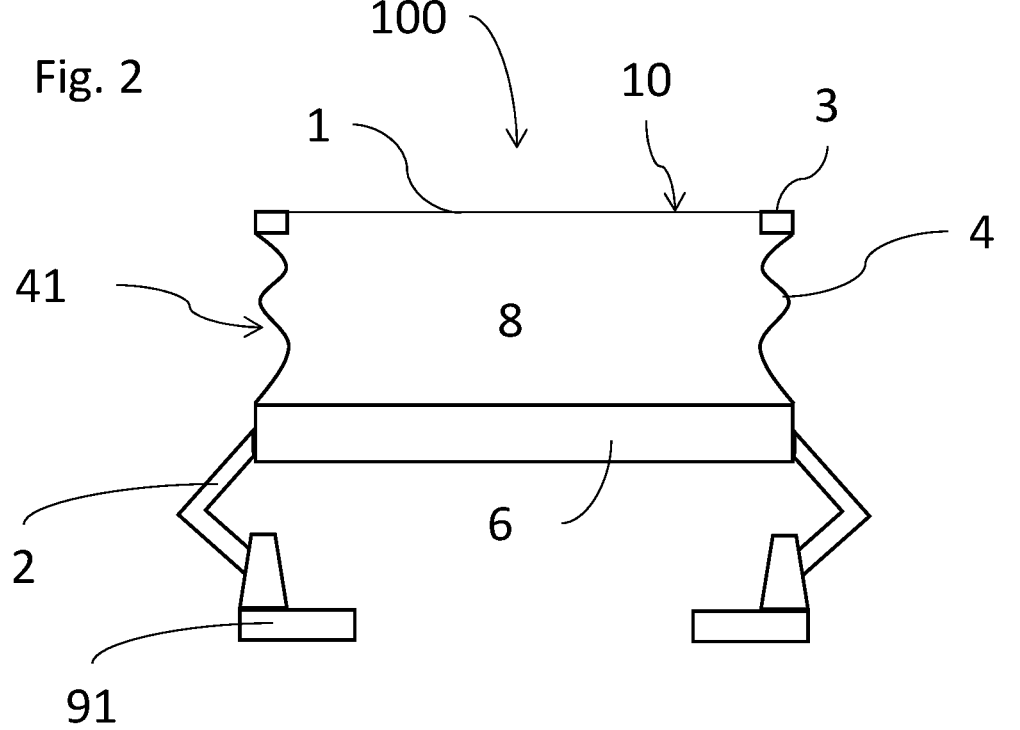
FIG. 2 shows another view of the embodiment shown in FIG. 1, showing that the tunable optical component comprises a particle trap, wherein the particle trap is arranged to prevent deposition of particles on the optically active area.

As shown in the embodiments of FIGS. 1 and 2, the tunable optical component 100 comprises a particle trap 4, wherein the particle trap 4 is arranged to prevent deposition of particles on the optically active area 10, wherein the particles result from abrasion of the piezo unit 20 or from abrasion of the counterpart 203. The particle trap 4 comprises a sticky surface 41, wherein the particles are attached to the sticky surface 41 by means of adhesion. The particle trap may be part of a bellows structure, which encloses the liquid volume partially. In particular, the bellows structure provides liquid sealed connection between the shaping element 3 and a window element 6. The bellows structure is flexible and allows relative movement of the shaping element 3 and the window element 6.

Figure 12:
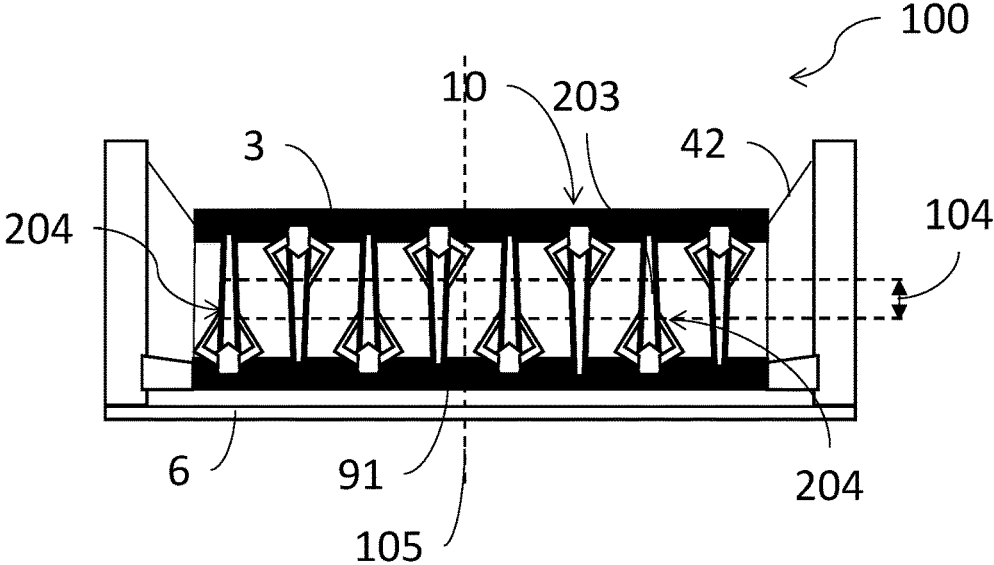
FIG. 12 shows an exemplary embodiment in which the actuator has at least four piezo units.
Figure 13:
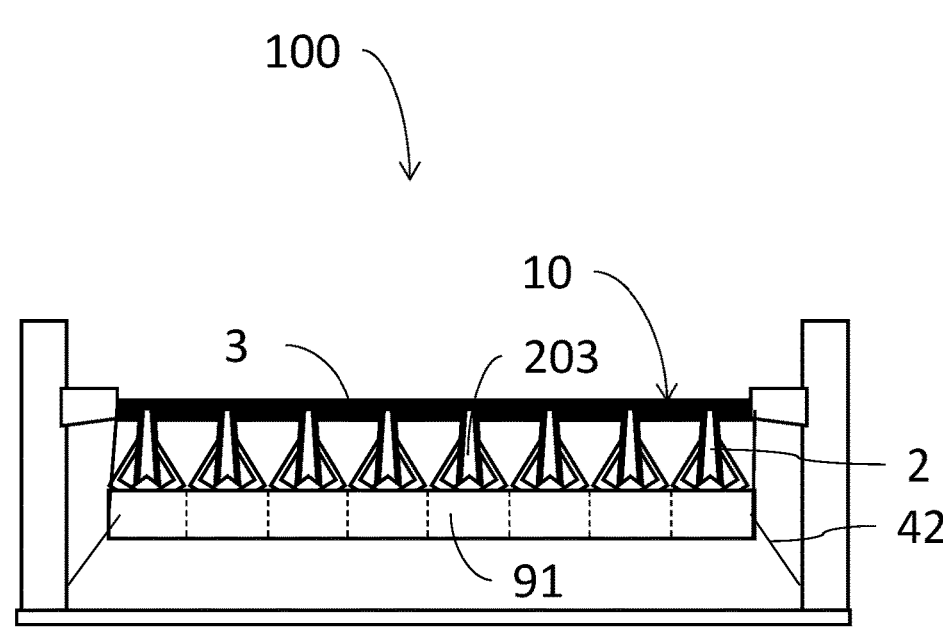
FIGS. 13 and 14 show exemplary embodiments in which the actuators are fixedly attached to the base element and the counterpart is fixedly attached to the shaping element.
Figure 14:
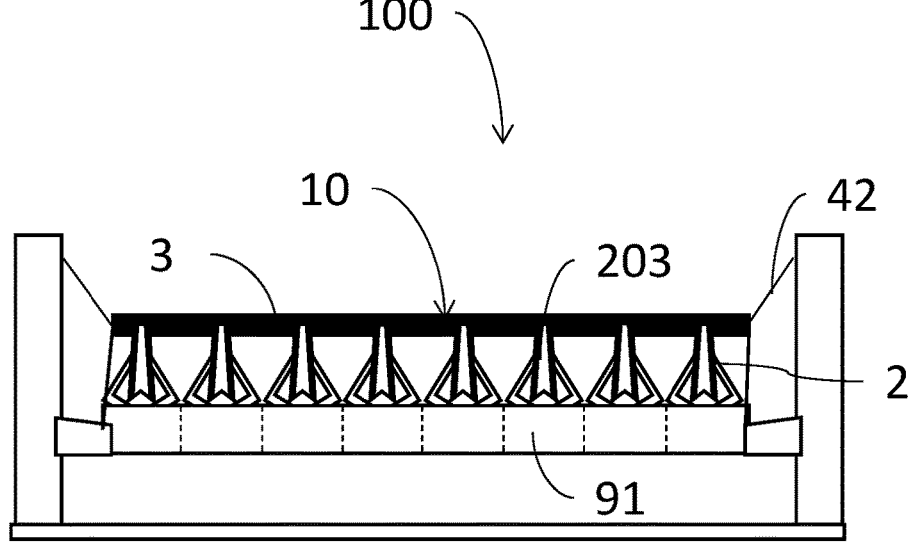

As shown in the exemplary embodiments of FIGS. 12,13 and 14, the particle trap 4 comprises a partition 42, wherein the partition 42 provides a spatial separation of the optically active area 10 and a contact region. The contact region is formed between the piezo unit 20 and the counterpart 203. The partition 42 may be a part of the flexible membrane 1.

As shown in the embodiment of FIG. 12 the actuator 2 comprises at least four piezo units 20, wherein the piezo units 20 are arranged circumferentially around the optically active area 10. The piezo unit 20 and the counterpart 203 form a common contact region 204 respectively, wherein in the contact region 204 piezo unit 28, in particular the lever 202, is in direct contact to the counterpart 203. In at least one tuning state of the tunable optical component 100, the contact region 204 of at least two of the piezo units 20 are arranged at an offset distance 104 along an optical axis 105 of the optical component 100. At least one of the piezo units 20 is fixedly attached to the shaping element 3 and the corresponding counterpart 203 is fixedly attached to the base element 91 and at least one of the piezo units 20 is fixedly attached to the base element 91 and the corresponding counterpart 203 is fixedly attached to the shaping element 3. The counterparts 203 and the piezo units 20 are arranged alternatingly around the circumference of the shaping element 3. The counterparts 203 and the piezo units 20 are arranged alternatingly around the circumference of the base element 91.

As shown in the exemplary embodiments of FIGS. 13 and 14, the actuators 20 are fixedly attached to the base element 91 and the counterpart 203 is fixedly attached to the shaping element 3. In particular, the counterpart is formed of elastic elements which are formed in a one-piece manner with the shaping element 3. The base element 91 may be arranged to provide a common electrical connection for piezo units 20, and the shaping element 3 may provide a common electrical connection for piezo units 20 attached to the shaping element 3.

Alternatively, the actuators 20 may be fixedly attached to the shaping element 3 and the counterpart 203 is fixedly attached to the base element 91.

Figure 10:
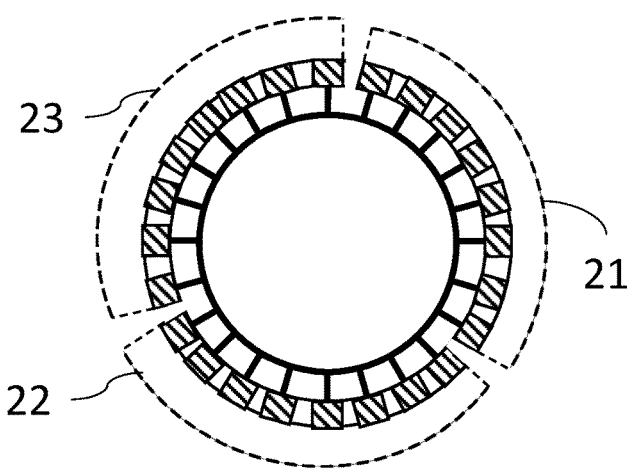
FIGS. 10 and 11 show embodiments in which the piezo units are assigned to a first group, a second group or a third group.
Figure 11:
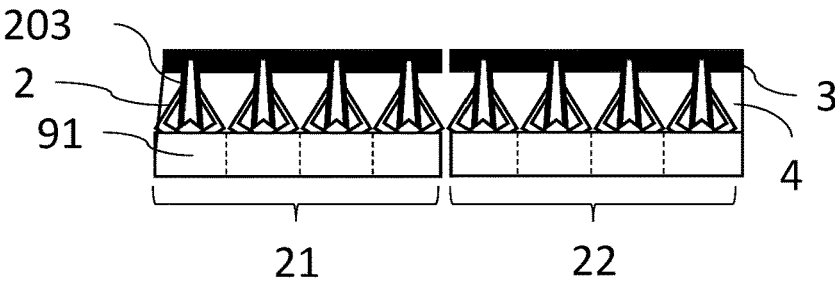

As shown in the exemplary embodiment in FIGS. 10 and 11, the piezo units 20 are assigned to a first group 21, a second group 22 or a third group 23, wherein the groups 21, 22, 23 of piezo units 20 are individually controllable. In particular, the base element 91 may be separated into multiple portions, wherein each portion is arranged to provide an electrical connection one of the groups 21, 22, 23 of piezo units 20. In particular, during fabrication the base element 91 may be separated by cutting the base element 91 into the multiple portions, in order so electrically insulate the portions of the base element 91 from one another.

Figure 3:
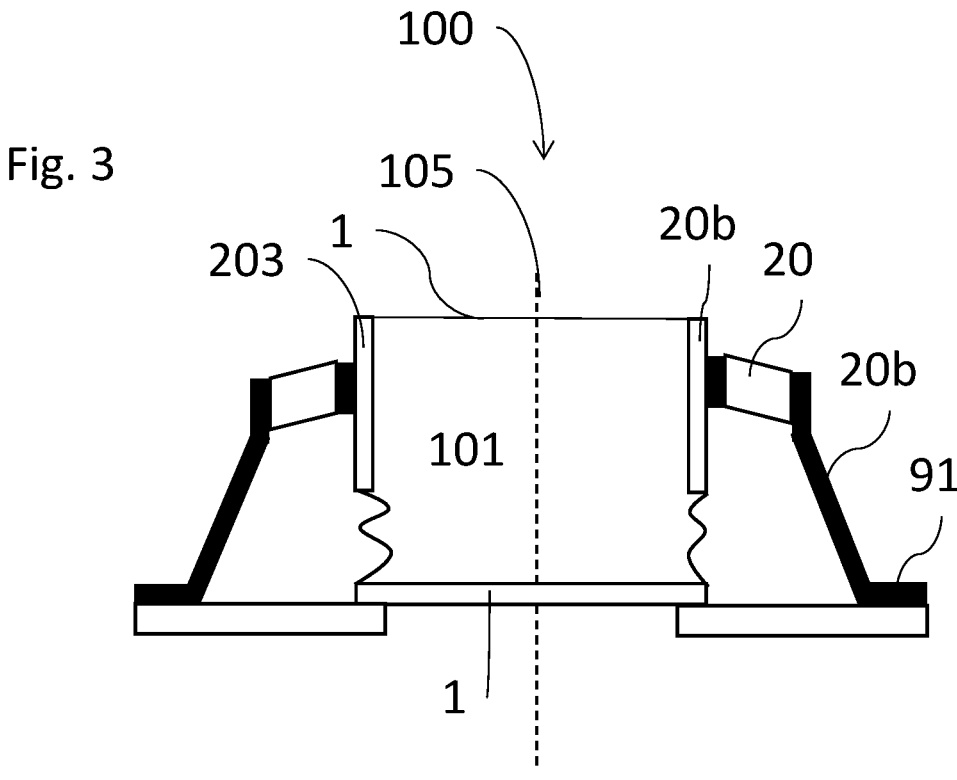
FIG. 3 shows an embodiment of the tunable lens in which the counterpart provides a first electrical contact for the piezo unit and the base element provides a second electrical contact for the piezo unit.

As shown in the exemplary embodiment in FIG. 3, the counterpart 203 provides a first electrical contact 20a for the piezo unit 20 and the base element 20b provides a second electrical contact 20b for the piezo unit. The first electrical contact 20a is a sliding contact, which enables relative motion of the piezo unit 20 and the counterpart 203 along the optical axis 105. The first electrical contact 20a is formed by the coupling the piezo unit 20 to the counterpart 203 in a force-fitting manner. The base element may comprise multiple elastic elements, onto which the piezo units 20 are mounted. The elastic elements are arranged to provide a normal force, perpendicular with respect to a surface of the counterpart 203.

Figure 4:
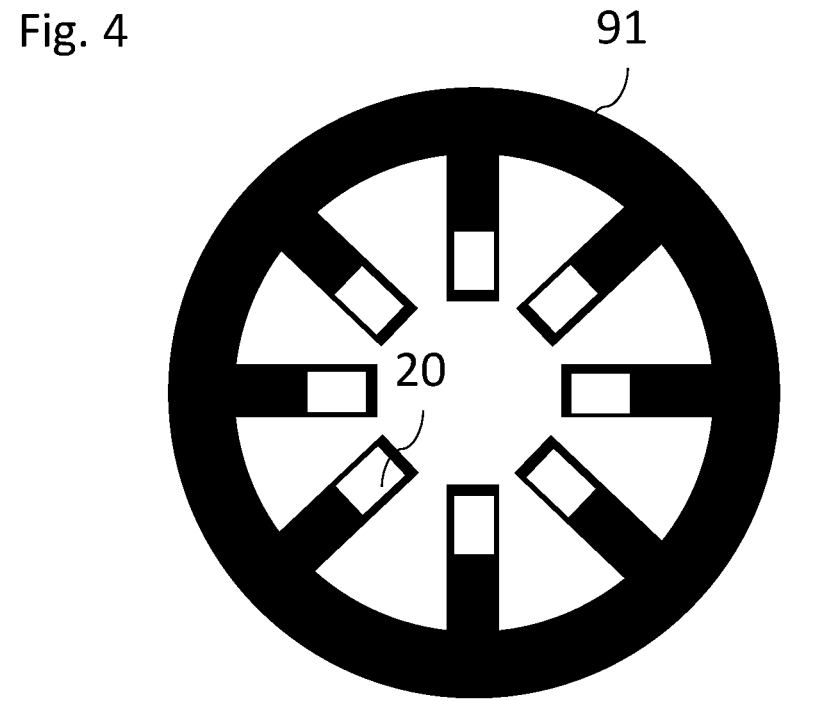
FIG. 4 shows an embodiment in which the base element is formed as a ring with multiple bending beams extending radially.

As shown in the exemplary embodiment in FIG. 4, the base element 91 is formed as a ring with multiple bending beams extending radially. The bending beams are bent out of plane of the ring, whereby the piezo units 20 face towards the center of the ring.

Figure 5:
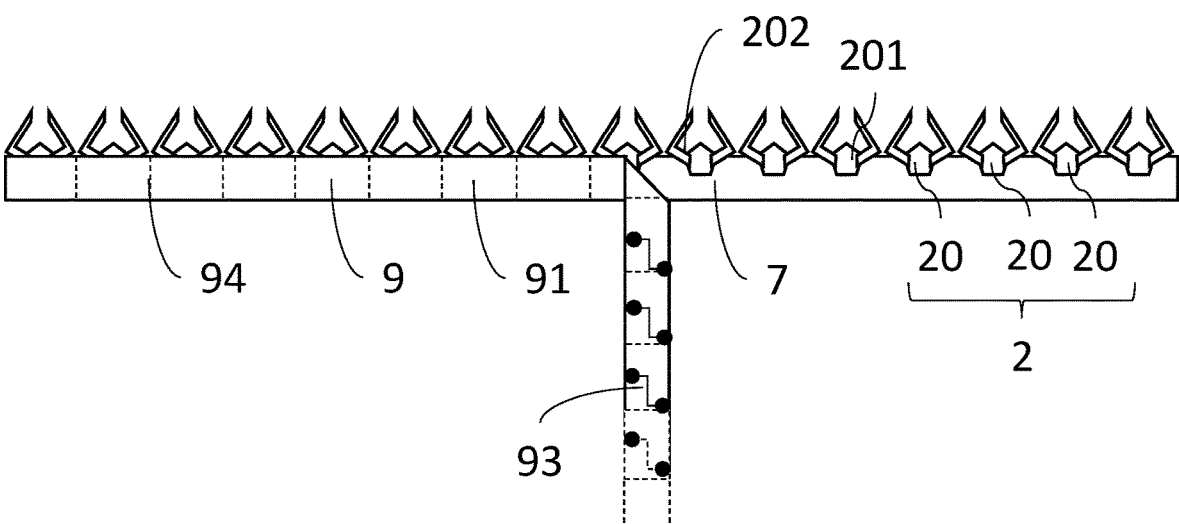
FIG. 5 shows an exemplary embodiment in which the piezo unit has two levers and a piezo element.
Figure 6:
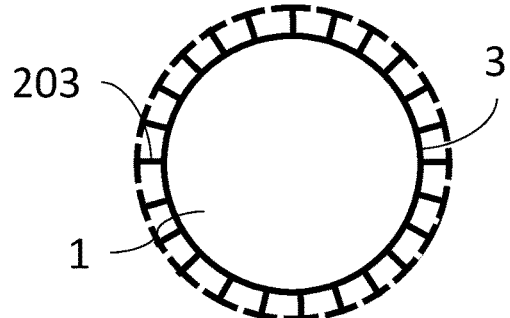
FIG. 6 shows an exemplary embodiment in which the counter parts are formed as T-shaped bending beams.
Figure 7:
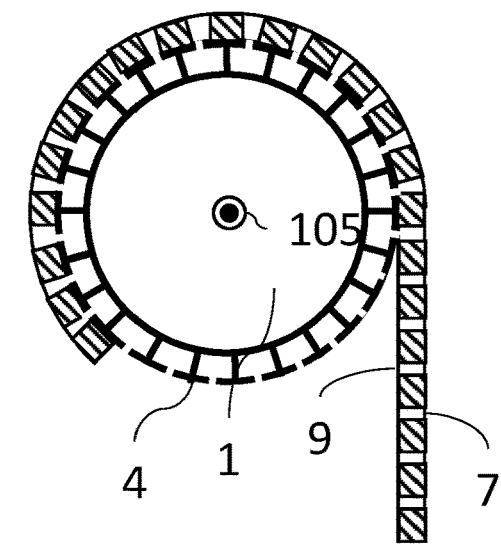
FIGS. 7-9 illustrate a step in the method of the fabrication of the described tunable optical component in which the carrier is attached to the base element or the carrier forms the base element.
Figure 8:
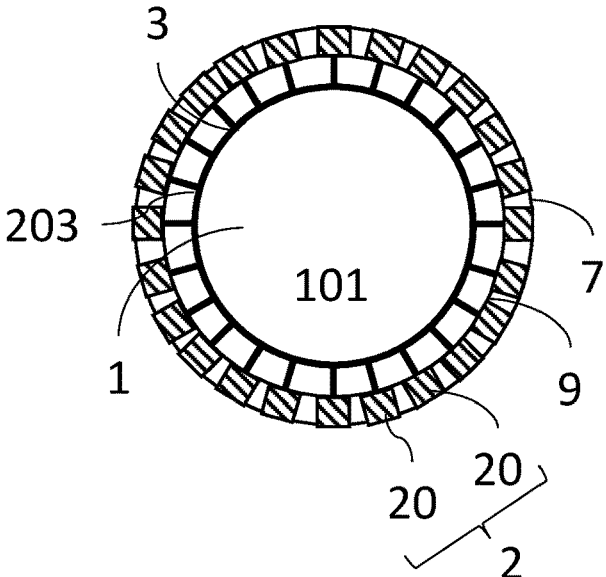
Figure 9:
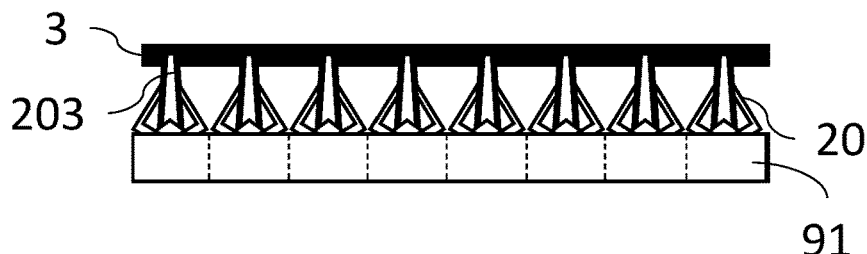

As shown in the exemplary embodiment in the FIGS. 5, 6, 7 and 8, the method for fabrication of the tunable optical component comprises the steps of a) Providing a shaping element 3 with multiple counterparts 203 (FIG. 6);

b) Providing multiple actuators 20 which are arranged on a common carrier 7 (FIG. 5);

c) Attaching the piezo units 20 to the counterparts 203 in a force-fitting manner, wherein the carrier 7 is attached to the base element 91 or the carrier 7 forms the base element 7 (FIGS. 7 and 8).

As shown in FIG. 6, the counter parts 203 are formed as T-shaped bending beams. For connecting the counterparts 203 to the piezo units 20, the free ends of the T-shaped bending beams ere bent out of plane of the main extension plane of the shaping element 3.

As shown in the exemplary embodiment of FIG. 5, the piezo unit 20 comprises two levers 202 and a piezo element 201. The levers form a tweezer, wherein the ends of the T-shaped bending beams are arranged between the tweezers in method step c. In method step c, the piezo units are arranged on the common carrier 7, wherein the carrier 7 is bent around the optical axis 105.

As shown in the embodiment of FIG. 3, in method step b) a contact mount 9 is provided, wherein the contact mount 9 is attached to the actuators 20 on a side facing away from the carrier 7. In particular, the contact mount 9 and the carrier form the base element 91. The contact mount may be connected by means of soldering, in particular reflow soldering, o by means of a conductive adhesive.

The contact mount 9 comprises conductors 93, wherein the conductors 93 provide individual electrical connection to the piezo units 20. The carrier 7 and/or the contact mount 9 comprise intended bending points 94, wherein the carrier and/or the contact mount 9 are bent at the intended bending points 94 in method step c). In particular, the intended bending points are regions of the carrier 7 and/or the mount 9, wherein the thickness of the carrier and/or mount is. In particular, the intended bending point is arranged to reduce shear forces, caused by bending the carrier and or the mount in method step c).

LIST OF REFERENCE SIGNS 1 membrane
2 actuator
3 Shaping element
4 Particle trap
6 Window element
7 carrier
9 Contact mount
101 Liquid chamber
102 liquid
10 Optically active area
20 Piezo unit
201 Piezo element
202 Lever
203 counterpart
41 Sticky surface
42 partition
204 Contact region
91 Base element
20*a* First electrical contact
20*b* Second electrical contact
93 conductors
105 Optical axis
100 Optical component
104 Offset distance

The invention claimed is:
1. Tunable optical component (100) comprising a liquid chamber (101), a flexible membrane (1), a shaping element (3), and an actuator (2), wherein
  the liquid chamber (101) is filled with a liquid (102)
  the membrane (1) delimits the liquid chamber (101),
  the membrane (1) is attached to the shaping element (3),
  the shaping element (3) has a ring shape, wherein the shaping element (3) surrounds an optically active area (10) of the membrane (1),
  the actuator (2) comprises multiple piezo units (20),
  the piezo unit (20) is coupled to a counterpart (203) in a releasable force-fitting manner,
  the piezo unit (20) is arranged to move the counterpart (203), and
  the relative movement of the counterpart (203) and the piezo unit (20) results in a movement of the liquid (102), which causes a change of an optical property of the optically active area (10), wherein if a tangentially acting load force is greater than a static friction force between the piezo unit (20) and the counterpart (203), the piezo unit (20) and the counterpart (203) are slidably movable with respect to each other.
2. Tunable optical component (100) according to claim 1, wherein the tunable optical component (100) is a tunable lens, and the optical property is at least on of spherical power, cylinder power, cylinder axis, prism power, prism axis.
3. Tunable optical component (100) according to claim 1, wherein the counterpart (203) is an elastic element, wherein the resonance frequency of the elastic element is smaller than a resonance frequency of the piezo unit (20).
4. Tunable optical component (100) according to claim 3, wherein the elastic element is formed in a one-piece manner with the shaping element (3).
5. Tunable optical component (100) according to claim 1, comprising a particle trap (4), wherein the particle trap (4) is arranged to prevent deposition of particles on the optically active area (10), wherein the particles result from abrasion of the piezo unit (20) or from abrasion of the counterpart (203).
6. Tunable optical component (100) according to claim 5, wherein the particle trap (4) comprises a sticky surface (41), wherein the particles are attached to the sticky surface (41) by means of adhesion, and/or
  the particle trap (4) comprises a partition (42), wherein the partition (42) provides a spatial separation of the optically active area (10) from piezo unit (20) and the counterpart (203).
7. Tunable optical component (100) according to claim 6, wherein the partition (42) is a part of the flexible membrane (1).
8. Tunable optical component (100) according to claim 1, wherein the actuator (2) comprises at least four piezo units (20), wherein
  the piezo units (20) are arranged circumferentially around the optically active area (10),
  the piezo unit (20) and the counterpart (203) form a common contact region (204) respectively, wherein in the contact region (204) the piezo unit (20) is in direct contact to the counterpart (203), and
  in at least one tuning state of the tunable optical component (100), the contact region (204) of at least two of the piezo units (20) are arranged at an offset distance (104) along an optical axis (105) of the optical component (100).
9. Tunable optical component (100) according to claim 1, wherein the piezo units (20) are fixedly attached to a base element (91) and the counterpart (203) is fixedly attached to the shaping element (3) or the piezo units (20) are fixedly attached to the shaping element (3) and the counterpart (203) is fixedly attached to the base element (91).
10. Tunable optical component (100) according to claim 8, wherein,
  at least one of the piezo units (20) is fixedly attached to the shaping element (3) and the corresponding counterpart (203) is fixedly attached to the base element (91), and
  at least one of the piezo units (20) is fixedly attached to the base element (91) and the corresponding counterpart (203) is fixedly attached to the shaping element (3).
11. Tunable optical component according to claim 10, wherein the counterparts (203) and the actuators (20) are arranged alternatingly around the circumference of the shaping element (3) and wherein the counterparts (20) and the piezo units (20) are arranged alternatingly around the circumference of the base element (91).
12. Tunable optical component according to claim 10, wherein the base element (91) provides a common electrical connection for actuators attached to the base element (91), and the shaping element (3) provides a common electrical connection for actuators (20) attached to the shaping element (3).
13. Tunable optical component according to claim 1, wherein the piezo units (20) are assigned to a first group (21), a second group (22) or a third group (23), wherein the groups (21, 22, 23) of piezo units (20) are individually controllable.

14. Tunable optical component according to claim 9, wherein the counterpart (203) provides a first electrical contact (20*a*) for the piezo unit (20), the base element (20*b*) provides a second electrical contact (20*b*) for the piezo unit (20), the first electrical contact (20*a*) is a sliding contact, and the first electrical contact (20*a*) is formed by the coupling the piezo unit (20) to the counterpart (203) in a force-fitting manner.

15. Method for fabrication of the tunable optical component according to claim 1, comprising the steps of:

a) Providing a shaping element (3) with multiple counterparts (203)

b) Providing multiple actuators (20) which are arranged on a common carrier (7)

c) Attaching the actuators (20) to the counterparts (203) in a force-fitting manner, wherein the carrier (7) is attached to the base element (91) or the carrier (7) forms the base element (91) at least partially.

16. Method according to claim 15, wherein in method step b) a contact mount (9) is provided, wherein the contact mount (9) is attached to the actuators (20) on a side facing away from the carrier (7), the contact mount (9) comprises conductors (93), wherein the conductors (93) provide individual electrical connection to the actuators (20).

17. Method according to claim 15, wherein in method step c) the carrier (7), and in particular the contact mount (9), are bent around the optical axis (105), the carrier (7) and/or the contact mount (9) comprise intended bending points (94), wherein the carrier (7) and/or the contact mount (9) are bent at the intended bending points (94) in method step c).

18. Tunable optical component according to claim 1, wherein in a first state of the actuator (2) a mutual displacement of the piezo unit (20) and the counterpart (203) is prevented as long as the counter-force caused by the static friction is not exceeded.

19. Tunable optical component according to claim 18, wherein in a second state of the actuator (2), the force or frictional connection is released and a contact area between the piezo unit (20) and the counterpart (203) is moved along a surface of the counterpart (203).

20. Tunable optical component according to claim 1, wherein the piezo unit (20) and the counterpart (203) slide on each other if the tangentially acting load force is greater than the static friction force.

21. Tunable optical component according to 19, wherein the actuator (2) is arranged to switch between the first state and the second state, to move the counterpart (203) with respect to the piezo unit (20).

22. Tunable optical component according to 19, wherein the actuator (2) is arranged to switch between the first state and the second state, to move the counterpart (203) with respect to the piezo unit (20).

* * * * *